June 6, 1933.     H. W. WIDENER     1,912,958
LUGGAGE CARRIER
Filed Oct. 14, 1930
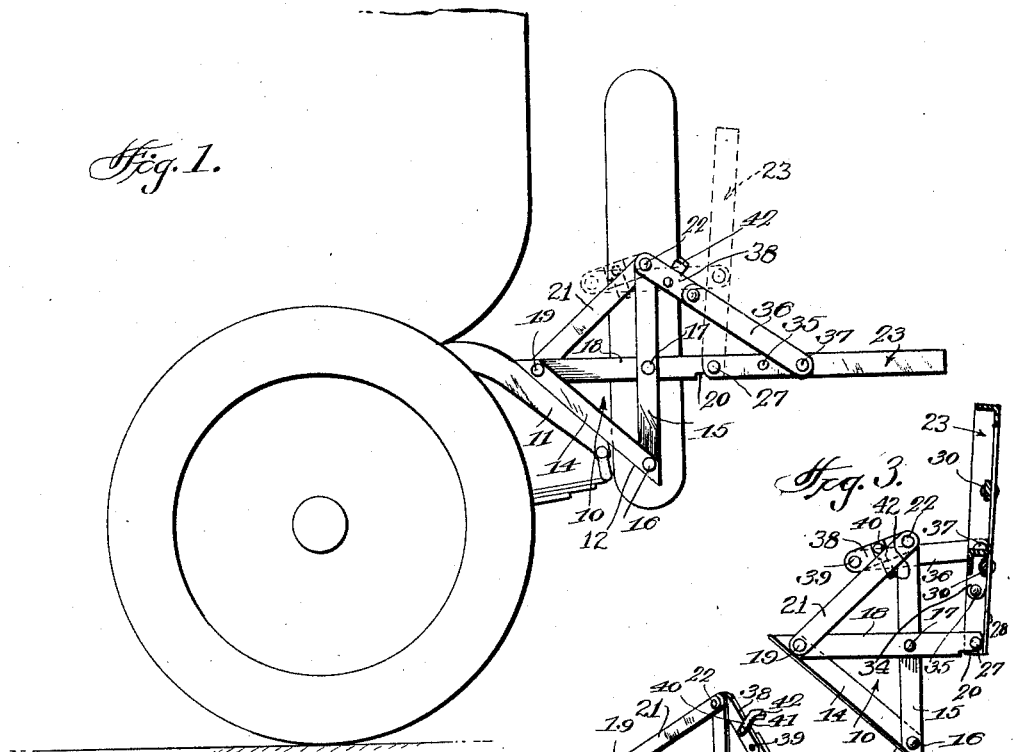
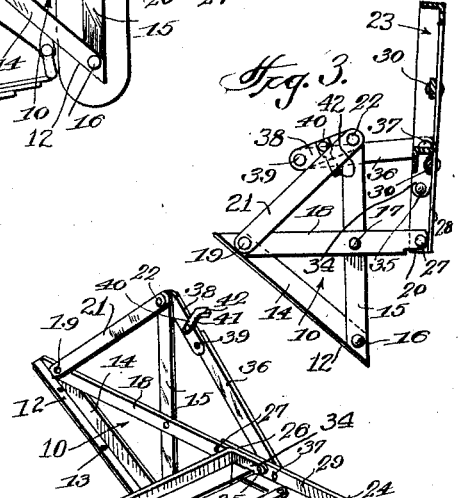
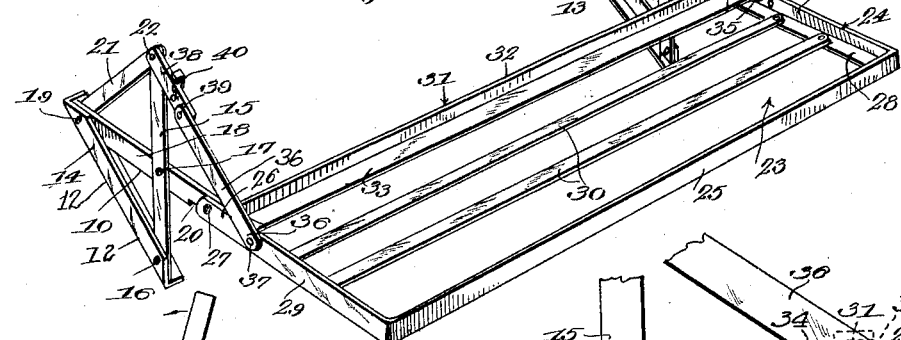
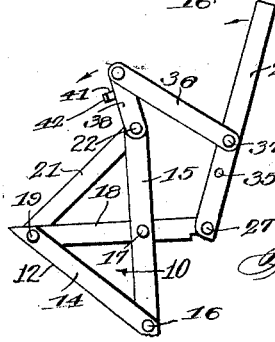
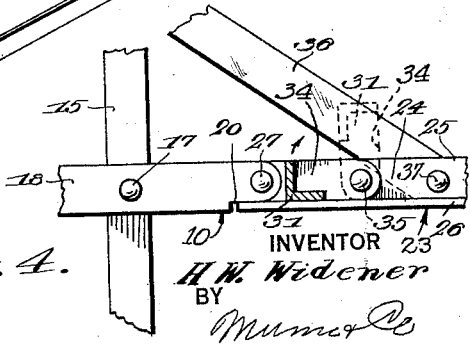
INVENTOR
*H. W. Widener*
BY
*Mumer & Co*
ATTORNEY Patented June 6, 1933

1,912,958

UNITED STATES PATENT OFFICE

HOMER W. WIDENER, OF SKELLYTOWN, TEXAS

LUGGAGE CARRIER

Application filed October 14, 1930. Serial No. 488,679.

This invention relates to luggage carriers, and more particularly to an extensible or folding type and it consists in the constructions, arrangements and combinations herein described and claimed.

It is an object of my invention to provide a luggage carrier which may be readily attached to a vehicle and which may be quickly and easily extended for use.

It is a further object of my invention to provide a luggage carrier wherein the extensible or folding portion of the carrier is automatically locked in a raised position.

A still further object of my invention is the provision of a luggage carrier which is readily mounted upon the rear end of the chassis frame of an automobile and which may be folded up against a spare tire when not in use.

Another object of the invention is to sustain a luggage platform upon a support by means of a simple truss with the result of enabling the platform to carry very heavy weights without the danger of breaking from its anchorage.

Additional objects, advantages and features of invention will be apparent from the following description, considered in conjunction with the accompanying drawing wherein:

Figure 1 is a fragmentary side elevation of a vehicle equipped with my invention, Figure 2 is a perspective view of my carrier, in extended position, Figure 3 is a cross section of the carrier in raised locked position, Figure 4 is an enlarged detail view illustrating the mounting of the luggage platform, and Figure 5 is a side elevation of my carrier, illustrating the position of the parts, just prior to reaching their final locking positions.

In carrying out my invention, I provide a pair of bracket structures, generally indicated by the reference character 10 adapted to be secured to a support, for example the projecting end portions 11 of the chassis of a vehicle. Since the bracket structures 10 are identical in construction, only one will be specifically described, but reference characters employed to designate the various elements will be applicable to both structures.

The structure 10 in the preferred form comprises an angle bar 12 one flange thereof being apertured as at 13 (Fig. 2) for securement to the chassis ends 11 by bolts, or otherwise. Upon the vertically extended flange 14 of said bar, and at the rear end thereof a member 15 is riveted as at 16, this member extending vertically as clearly shown in Figures 1 and 3.

Intermediate the ends of the member 15 there is riveted, as at 17, a horizontal bracket 18, one end thereof lying flush against the flange 14 and secured by a rivet 19. The other end of this bracket is cut away along its under side to provide a recess 20.

A short brace 21 is extended between the angle bar 12 and the outer end of the member 15 and is suitably secured by the rivets 19 and 22.

A luggage platform 23 is pivotally secured upon the projecting ends of the bracket 18, as will now be described. The platform 23 is formed from an angle bar 24 bent into a substantially U-shaped formation having a transverse bar 25, terminating in oppositely disposed legs 26, which leg members are pivotally secured to the bars 18 by pivot bolts 27. The transverse bar 25 and legs 26, as previously stated, are formed from an angle bar, and are so positioned as to present a horizontal flange 28 and a vertical flange 29.

Cross slats 30 are secured between opposed horizontal flanges 28 to form a support for the luggage.

A combined brace and retainer bar 31 is provided and extends across the rear open end of the luggage platform 23, as clearly shown in Fig. 2. The brace 31 is also formed from angle iron and is bent into U-shaped formation, presenting an upright flange 32 and horizontal flange 33. The flange 32 provides short leg members 34 which are apertured to receive a pivot bolt 35 carried by the flange 29 of the platform.

As clearly shown in Figures 2 and 4, the brace 31 is so pivoted upon the upright flanges 29 that when in its opened position, the horizontal flange 33 will rest flatly upon the horizontal flange 28. Thus, the flange 33 will be in the same horizontal plane as the slats 30, thereby providing a flat surface upon which luggage may rest. It will also be apparent, that by providing the vertical flanges 29 and 32, luggage will be securely retained against slippage from the platform.

A jointed brace extends from the member 15 to the platform, this brace comprising a link 36, pivoted upon the flange 29 of the platform 23 by a pivot bolt 37, and a short link 38 pivotally connected at 22 to the member 15. The links are pivoted together in overlapped relation as at 39. The links 36 and 38 are extended in line with one another when the luggage carrier is in open position, and at the same time assume a diagonal position with respect to the platform, as clearly shown in Figure 2.

The brace last described has a stop 40, this being carried by the link 38. The stop, in the present instance, embodies a stem portion 41, the free end of which is bent at right angles, to provide a bill 42. The stop 40 extends upwardly, in the open position of the carrier, but in folded position, the bill portion 42 will be so positioned as to afford a support and stop for the link 36, as shown in Figure 3. From what has been stated it will be apparent that the bracket structure, mainly the bracket 18, member 15 and braces 21, 36 and 38 constitute a truss. This is a simple truss such as may be encountered in a small bridge. The bracket 18 is a fixture on a support which in this instance is an automobile. It plays the part of a tie bar in the simple truss.

The member 15 serves as the king post while the parts which go down in diverging directions from the top of the king post are the braces. It has been determined by actual trial that the platform 23 is capable of carrying very heavy weights because of the fact that the downward pressure is so distributed in the truss and in turn transferred to the support that there is no danger of breaking the platform from its anchorage.

In operation of my luggage carrier it will be assumed that the carrier is in extended position, and that the platform is to be moved into inoperative or folded position as indicated in dotted lines in Figure 1.

With the platform in a horizontal position the brace 31 is swung inwardly as shown in Figure 4 to provide sufficient clearance to permit the platform to swing upwardly. Upward pressure is now exerted upon the undersides of the links 36 and 38 adjacent the pivot 39. Such pressure will cause the short link 38 to swing upwardly and rearwardly (see Fig. 5) and consequently move the platform 23 to a substantially vertical position.

It should be noted that in the upward and backward movement of the link 38 the stop 40 will be projecting downwardly, presenting the bill 42 in the path of movement of the link 36 for a purpose which will presently appear.

A final downward pressure is exerted upon the link 38 until the pivot 39 has moved to a point below a horizontal center line of the pivot 22, thus locking the platform in its folded position. In locked or folded position of the carrier, it will be apparent that the bill 42 engages and stops the link 36 against further downward movement.

To open the carrier it is only necessary to exert upward pressure upon the extremity of link 38 until it has passed upwardly and beyond a vertical center line of the pivot 22, when downward pressure upon the platform 23 will straighten the links 36 and 38 to an aligned position as shown in Figures 1 and 2.

In the extended position of the platform 23 the flange 28 is accommodated within the recess 20 of the bar 18, and by reason of this construction will afford a stop against further downward movement of the platform.

The carrier is made of a width suitable for the width of the vehicle chassis, and it can be modified as to detail construction, size and form without departing from the scope of the invention.

I claim:—

1. A luggage carrier comprising a support, a pair of brackets mounted thereon, each of said brackets having an upwardly extending portion, a platform mounted between said brackets for swinging movement to a vertical inoperative position, hinged link members pivoted upon each side of said platform and to respective upwardly extending portions of said brackets, and said hinged links partaking of an upwardly and rearwardly swinging movement upon upward swinging movement of said platform to position the hinge of said links below a horizontal center line of the pivot of each link member upon each respective bracket.

2. A luggage carrier comprising a support, a pair of brackets mounted thereon, each of said brackets having an upwardly extending portion, a platform mounted between said brackets for swinging movement to a vertical inoperative position, hinged link members pivoted upon each side of said platform and to respective upwardly extending portions of said brackets, said hinged links partaking of an upwardly and rearwardly swinging movement upon upward swinging movement of said platform to position the hinge of said links below a horizontal center line of the pivot of each link member upon each respective bracket, and stop means for limiting the downward swinging movement of said hinged links.

3. In a device of the character described, a support, a pair of spaced brackets, each of said brackets having an upwardly extended portion, a pivot intermediate the height of each bracket, and a pivot at the upper end of each upwardly extended portion, a luggage platform pivoted upon said intermediate pivot and adapted to swing to a vertical inoperative position, a compound linkage comprising a long and short link pivoted in overlapped relation defining a hinge, said long link being pivoted to said platform and said short link being pivoted to said pivot of the upwardly extended portion, said links being movable upwardly and rearwardly simultaneously with upward movement of said platform to position the hinge thereof rearwardly of and below a horizontal center line of the pivot of said upwardly extended portion, and a stop carried by said short link to engage said long link to limit downward movement of said link members.

4. In a device of the character described, a support, a pair of spaced brackets, each of said brackets having an upwardly extended portion, a pivot intermediate the height of each bracket, and a pivot at the upper end of each upwardly extended portion, a luggage platform pivoted upon said intermediate pivot and adapted to swing to a vertical inoperative position, a compound linkage comprising a long and short link pivoted in overlapped relation defining a hinge, said long link being pivoted to said platform and said short link being pivoted to said pivot of the upwardly extended portion, said links being movable upwardly and rearwardly simultaneously with upward movement of said platform to position the hinge thereof rearwardly and below a horizontal center line of the pivot of said upwardly extended portion, and a stop carried by said short link, said stop including a bill disposed in the path of long link to limit downward movement of said link members.

5. A luggage carrier comprising a platform, and a simple truss for sustaining the platform said truss comprising a bracket adapted to be fixedly attached to a support, a pivotal mount for the platform on the bracket, said bracket forming a tie bar, a member extending from the bracket and forming a king post, a brace extending from one end of the bracket to the approximate extremity of said member, and a second brace extending from said extremity to a point on the platform beyond its pivotal mount, the ends of the second brace being pivotally connected to the king post and platform respectively, said second brace having a pivotal joint.

6. A luggage carrier comprising a platform, and a simple truss for sustaining the platform said truss comprising a bracket adapted to be fixedly attached to a support, a pivotal mount for the platform on the bracket, said bracket forming a tie bar, a member extending from the bracket and forming a king post, a brace extending from one end of the bracket to the approximate extremity of said member, a second brace extending from said extremity to a point on the platform beyond its pivotal mount, the ends of the second brace being pivotally connected to the king post and platform respectively, said second brace having a pivotal joint, and stop means on the second brace at one side of its pivotal joint.

7. A luggage carrier comprising a platform, a simple truss including a tie beam and braces, at each end of the platform for connection with a support, and means by which the platform is pivotally connected with the tie beam and one of the braces of said truss.

HOMER W. WIDENER.